April 11, 1944.  C. A. BREWER  2,346,353
CONTROL SYSTEM FOR MOTOR VEHICLES
Original Filed Oct. 2, 1929
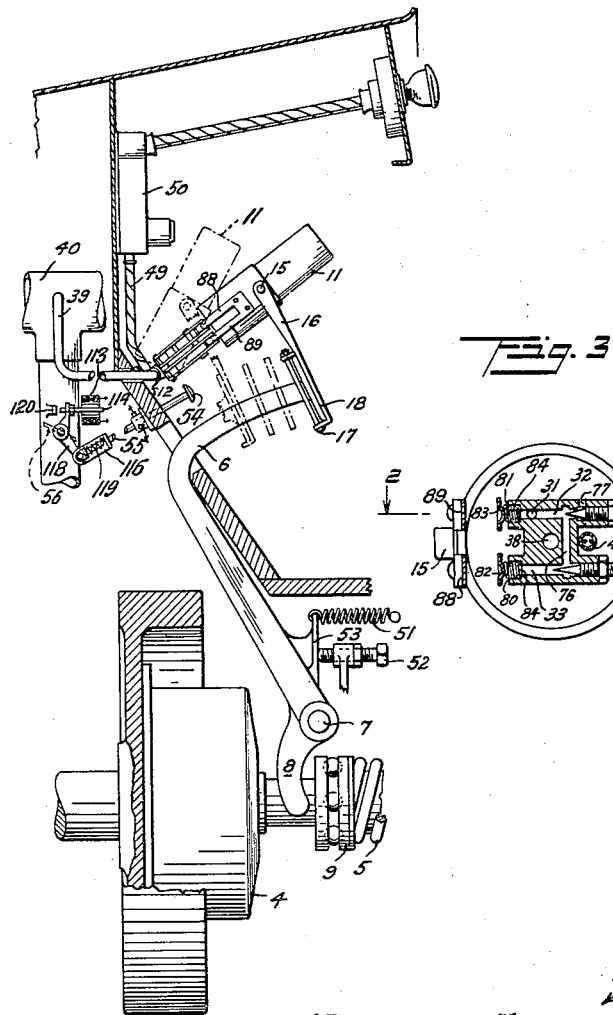
INVENTOR.
Charles A. Brewer
BY F. Bascom Smith
ATTORNEY Patented Apr. 11, 1944

2,346,353

UNITED STATES PATENT OFFICE 2,346,353

CONTROL SYSTEM FOR MOTOR VEHICLES

Charles A. Brewer, Noroton Heights, Conn., assignor of one-half to Philip J. Kury, Arverne, N. Y.

Original application October 2, 1929, Serial No. 396,691. Divided and this application January 17, 1944, Serial No. 518,648

19 Claims. (Cl. 192—01)

This invention relates to motor vehicles or the like and more particularly to a safety control system for controlling the operation thereof whereby safety in operation and ease of control are materially enhanced.

This application is a division of my copending application Serial No. 396,691 for "Safety control system for motor vehicles," filed October 2, 1929, and all subject matter contained in said copending application which is applicable to the disclosure of the present application is made a part hereof by reference.

One of the objects of the present invention is to provide an improved operating and control means for the clutch of a motor vehicle or the like.

Another object of the invention is to provide novel means for controlling the power actuation of a clutch mechanism of a motor vehicle whereby safety is promoted, wear and tear on the vehicle and parts thereof are reduced, more uniform operation and control are attained, starting strains are reduced, and fatigue of the operator is materially lessened.

A further object is to provide an improved power control for a clutch whereby substantially no effort is required on the part of the driver in releasing the clutch and controlling the engagement thereof.

Still another object is to provide novel apparatus for actuating and controlling the engagement of a clutch of a motor vehicle or the like whereby a simulation of expert manual operation of the clutch is obtained.

Another object is to provide novel apparatus of the above character whereby positive uniform control of the clutch driving effort during the engaging period of the clutch parts may be obtained.

A still further object is to provide novel clutch actuating means which embodies a control device including the accelerator or throttle operating means of a vehicle.

Another object is to provide novel foot operated means for controlling both the clutch and the throttle of the engine of a motor vehicle or the like.

The above and further objects and novel features of this invention will more fully appear from the following detailed description taken in connection with the accompanying drawing. It is to be expressly understood, however, that the drawing is for the purpose of illustration only and is not designed as a definition of the limits of the invention, reference being primarily had for this latter purpose to the appended claims.

In the drawing, wherein like reference characters refer to like parts throughout the several views, Fig. 1 is a diagrammatic side elevation of a portion of the vehicle, partly in section and with parts broken away, illustrating one form of apparatus embodying the present invention;

Fig. 2 is a sectional detail view on an enlarged scale and with parts broken away of the clutch operating power device shown in Fig. 1, a portion of said view being taken substantially on line 2—2 of Fig. 3;

Fig. 3 is a detail sectional view taken substantially on line 3—3 of Fig. 2;

Fig. 4 is a diagrammatic elevation, on an enlarged scale and partly in section, showing a portion of a control mechanism and electrical circuit for said power device and the engine throttle; and, Fig. 5 is a front elevation of the foot pedal shown in Fig. 4, the view being taken substantially along line 5—5 of Fig. 4.

One form of clutch operating mechanism which may be employed in carrying out the present invention is illustrated in Figs. 1 to 3 inclusive wherein the clutch 4 of a motor vehicle, normally held in operative engaged position by spring 5, is adapted to be moved to disengaged position by the depression of a clutch pedal 6 of the type ordinarily provided for manual actuation of the clutch mechanism. Pedal 6 is pivotally mounted at 7 and is provided with a bifurcated portion 8 which is adapted to engage a bearing 9 for disengaging the clutch mechanism. A power device of the fluid pressure vacuum actuated type is provided for operating the clutch mechanism, said device being preferably attached directly to clutch pedal 6.

The power device comprises two relatively movable elements, in the present case a piston element 10 and a cylinder 11 enclosing the piston, either of which may be movable. In the embodiment shown, the piston represents the stationary element and the cylinder is moved relative thereto in a manner and for a purpose to appear hereafter. A bracket 12 is mounted on the foot board of the vehicle adjacent pedal 6 for supporting the power device. Preferably a stem 13 is connected at its upper end to piston 10 and is pivotally connected at its lower end to bracket 12 by any suitable means such as a pivot pin 14. Cylinder 11 carries trunnions 15 adapted for pivotal connection with a bracket arm 16, which may be clamped by any suitable means, as by bolts 17, to the head or foot rest 18 of clutch pedal 6. Therefore, as the cylinder moves, the clutch will be correspondingly shifted, the pivotal connections 14 and 16 permitting the power device to swing to compensate for the arcuate movement of head 18 about the pedal pivot 7.

The power device in the present instance is operated by suction from any suitable device, such, for example, as the intake manifold of the vehicle motor, and it is shown as electrically controlled although it can be manually or mechanically controlled. Piston 10 may carry the usual cup leather 19 to prevent leakage past the piston and it is guided in the cylinder by the annular walls 20. This piston also carries the control mechanism for the power device, said control mechanism comprising a solenoid 21 mounted in a casing 22 in the piston and having a central opening 23 through which extends an armature 24 having valves 25 and 26 at its opposite ends to control openings 27 and 28 respectively. Opening 27 is in the top wall of casing 22 and communicates with space 29 which in turn is normally in communication with the atmosphere through annular space 30, passage 31 in piston 10, and a pair of branch passages 32 and 33 (Fig. 3). The space 34 within casing 22 communicates with the space 35 in cylinder 11 above piston 10 through a plurality of passages 36 in the connecting and spacing bolts 37.

The opening 28 and valve 26 control communication from space 34 and passage 23 to a passage 38 extending longitudinally in stem 13 of piston 10, the latter passage being in constant communication with the hollow center portion of pivot pin 14 which is in turn connected through a suitable tubular connection 39 with a source of suction, such as the intake manifold 40 (Fig. 1) of the vehicle motor. A joint 41 permits relative turning movement between conduit 39 and pivot pin 14. This joint also serves as a means for carrying a check valve of any suitable type, such as ball 42, normally held against its seat by a spring 43. As shown in Fig. 2, check valve 42, 43 is so arranged as to permit air to flow from passage 38 to the intake manifold but to prevent flow of air in the opposite direction.

A spring 44 embraces the armature 24 and tends to shift the same downwardly to normally close valve 26, 28 and open valve 25, 27. Solenoid 21 is accordingly so constructed with relation to armature 24 that excitation thereof will raise the armature to close valve 25, 27 and open valve 26, 28. This will place passage 38 in communication with space 35 in cylinder 11 above piston 10, thus cutting said space off from communication with atmosphere and connecting the same with intake manifold 40, whereupon the air in space 35 is withdrawn through passages 36, space 23, 34, passage 38, and conduit 39. Cylinder 11 and bracket 16 are thus moved downwardly relative to piston 10 to actuate clutch pedal 6 and thereby disengage the clutch mechanism.

In order to energize solenoid 21 for the purpose above pointed out, lead wires 45 are led to the solenoid through a tube 46 attached to piston 10 and stem 13, said wires being connected at their outer ends to a suitable jack 47. The lower end of the latter is contacted by a pair of spring contacts 48 which are in turn connected to a suitable source of electrical energy through a flexible protective cable 49 and a connection box 50, said box being mounted in any suitable position where it is easily accessible and in which the desired electrical connections may be made to the various control switches to be later described.

It will, of course, be apparent that when the vehicle is in operation, power device 10, 11 is in the full line position illustrated, i. e., with cylinder 11 in its upper position, valve 25 being open and space 35 communicating with atmosphere through space 29, 30 and passages 31 and 32. At this time, clutch pedal 6 is also in raised position and the clutch parts are in driving engagement. Upward movement of the clutch pedal and, hence, that of cylinder 11 under action of a suitable spring 51 is limited by an adjustable stop screw 52 carried by a stationary element of the vehicle frame and adapted to engage a lug 53 on pedal 6.

In the illustrated embodiment, an accelerator pedal 54 is connected by means of a push rod 55 and in a novel manner to be hereafter described, with the butterfly valve 56 of the vehicle carburetor, the connection between said rod and valve being preferably by a slip link, in a manner and for a purpose to be hereinafter described. It very often happens that when an accident is imminent that the driver becomes confused, especially if the conditions change very suddenly. If under such circumstances the driver has his foot on the accelerator, as in normal driving, his first impulse is to press downwardly with his foot since this is the movement which is used in applying the vehicle brakes. Many serious accidents have been caused by the driver pressing downwardly on the accelerator while thinking he had his foot on the brake pedal, so that instead of checking the speed of the car it was increased. The control device of Figs. 4 and 5 will obviate this danger.

In the arrangement shown in Fig. 4, there is a foot rest or pedal 54 which is mounted for limited downward sliding movement in a bracket 59 secured to the floor boards of the vehicle and also for turning movements in said bracket. Thus, the pedal 54 is mounted on a cylindrical support or shaft 150 which may turn in bracket 59 and also slide longitudinally in said bracket. An extension 58 of bracket 59 has a non-circular opening in which is mounted a similarly shaped guide 151 on push rod 55. The guide 151 and the opening for it may, for example, be square or of other desired non-circular shape so that rod 55 may slide longitudinally but will be held against turning movement. The upper end of rod 55 extends into a recess 152 in the reduced lower end of the stem or shaft 150 and carries a lateral pin 153 which projects into a curved cam slot 154 in shaft 150. This slot is so curved that when the foot rest 54 is turned to the right or clockwise, as viewed in Fig. 5, the wall of the slot will force the pin downwardly and with it the rod 55 to open the throttle valve 56. This throttle valve is connected to rod 55 by the slip link connection to be more fully hereinafter described.

Also mounted on bracket 59 and insulated therefrom by an insulating block 62 is a spring contact 63 connected through lead 48 to the solenoid 21 of the clutch releasing power device, which solenoid is in turn connected with a battery 65, and, if desired, to a solenoid 113, the operation of which will be described hereafter. The shaft 150 carries a metallic collar 155 fixed thereto by any suitable means, such as the pin 61. This collar is connected to ground through bracket 59 and a lead 48a and carries an extension 60 which is normally out of contact with the spring contact 63 but may engage it under certain conditions presently to be described.

A compression spring 57 reacts against collar 155 and the extension 58 to normally hold shaft 150 and foot rest 54 in their uppermost positions. Spring 57 is a relatively heavy spring, having sufficient compression to support the normal weight of the operator's foot on foot rest 54, and, therefore, maintain it in its uppermost position. A torsion spring 156 is connected at one end to bracket 59 and at its other end to shaft 150 and tends to turn said shaft in a counter-clockwise direction or to the left, as viewed in Fig. 5, to close the throttle, the movement in this direction being limited by a suitable stop 157 engaging one side of the foot rest. Torsion spring 156 is merely of sufficient strength to turn foot rest 54 and its shaft to this position and not place an undue strain on the foot of the operator.

In operation, throttle 56 is controlled by turning foot rest 54 more or less to the right, as indicated in dotted lines (Fig. 5) and, of course, the more the foot rest or pedal is turned in this direction the further will the throttle be opened by action of cam slot 154 on pin 153. Thus, in this construction, throttle 56 is not controlled during normal operation of the vehicle by a downwardly movement of the operator's foot as in the ordinary constructions. However, if the operator should, in the case of a threatened accident, press downwardly on the accelerator pedal 54, 150, instead of increasing the speed of the car, he would effect a closing of the throttle and throttle down the engine and also release the clutch. This is accomplished by the downward movement of shaft 150, causing the extension 60 to engage the spring contact 63 and close the circuit through solenoid 21 and through solenoid 113 when the latter is connected in the circuit in the manner shown.

Upon the energization of solenoid 21 in the above described manner, i. e., by depressing pedal 54 to close switch 60, 63, armature 24 will be raised, closing valve 25, and thus cutting off communication of chamber 35 above piston 10 with the atmosphere and at the same time opening valve 26 to place chamber 35 in communication with intake manifold 40 of the motor through passage 38. The suction of the motor creates a partial vacuum in chamber 35, causing cylinder 11 to be drawn downwardly, depressing clutch pedal 6 to release the clutch 4. Thus no foot operation of the clutch pedal is required by the operator, although he may depress pedal 6, at any time with his foot, to release the clutch if he wishes.

If the circuit through solenoid 21 is now broken at contacts 60, 63 by the release of accelerator pedal 54, armature 24 drops under the action of spring 44, closing valve 26 to shut off communication of chamber 35 with the intake manifold, and opening valve 25 to place this chamber 35 in communication with the atmosphere through conduit 31. Thus, the vacuum in chamber 35 is partially destroyed, permitting cylinder 11 to move upwardly under the action of springs 5 and 51 to permit the clutch to engage. If, however, this cylinder was merely permitted to move rapidly upwardly without any control, the clutch would be engaged too rapidly causing a sudden jerking start of the car or stalling of the motor. To overcome this objection, there is provided an automatic control which so controls the upward movement of cylinder 11 and engagement of the clutch mechanism that the latter is engaged in a manner simulating expert foot operation.

For this latter purpose, passage 31 is in communication with passages 32 and 33 and a cross passage 76 (Figs. 2 and 3). Passages 32 and 76 are constantly in communication with the atmosphere through an opening 77 which is restricted by an adjustable needle valve 78 to restrict and regulate the entrance of air. The communication of passage 33 with passage 76 is restricted and controlled by an adjustable needle valve 79. Passage 33 is also in communication with the atmosphere through an opening 80, while passage 32 is in communication with the atmosphere through a similar opening 81. Openings 80 and 81 are controlled by movable valves 82 and 83 respectively, which latter are normally held from their seats by springs 84.

Valves 82 and 83 are mounted on supports pivoted at 85, each of said supports carrying a cam block. The support for valve 82 carries cam block 86, while the support for valve 83 carries cam block 87, said blocks cooperating respectively with springs 88 and 89 mounted on cylinder 11 or the holder 11' therefor for movement therewith. The outer surfaces of cams 86 and 87 may be made any shape desired to control the opening and closing of valves 82 and 83 as cylinder 11 moves upwardly carrying spring fingers 88 and 89 over the surfaces thereof. In the arrangement shown in Figs. 2 and 3, cam 87 has a straight outer wall 90 while cam 86 is stepped or recessed as shown at 91 and 92 to provide spaced cam surfaces 93 and 94. When finger 89 presses on cam surface 90, it will close valve 81, 83. When finger 88 presses on either cam surface 93 or 94, valve 80, 82 will be closed. At other times, the valves 82 and 83 will be held in open position by springs 84. Since cams 86 and 87 control the atmosphere inlet to power device 10, 11 and hence the upward movement of the clutch pedal, it will be seen that said cams may be so shaped as to control the engaging movement of the clutch to give ideal clutch engagement. Preferably, cams 86 and 87 are adjustably mounted on their supports so that they may be adjusted longitudinally thereof to vary the time of operation of valves 82 and 83. Such an adjustable mounting, with respect to the position of the driving surfaces of the clutch mechanism, may be a bolt 95 passing through elongated slots in the supports of the cams.

When valve 83 is open, it permits relatively free entrance of air into cylinder 11 through passages 32, 31 space 30, 21, valve 25, 27 and passages 36. With valve 83 closed and valve 82 open, the entrance of air into cylinder 11 is controlled by needle valves 78 and 79 which may be adjusted to restrict the entrance of air and causing a partial vacuum to thereby retard upward movement of pedal 54 and hence the engaging movement of the clutch driving surfaces. If both valves 82 and 83 are closed, the entrance of air is controlled and may be highly restricted by needle valve 78, in which event the vacuum resisting the relative movement of cylinder 11 and piston 10 is effective to further retard the movement of the clutch surfaces. Thus by proper shaping and adjustment of cam blocks 86 and 87, valve 82 and 83 may be operated to vary the rate of movement of cylinder 11 in any desired manner, and accordingly obtain ideal clutch engagement.

When the vehicle clutch is disengaged in the manner heretofore described, the power device

10, 11 assumes the dotted line position illustrated in Fig. 1, spring fingers 88 and 89 extending below the cam surfaces 90 and 94. When the switch 60, 63 is opened, spring 44 becomes effective to shift armature 24 to close valve 26 and open valve 25, thus admitting air through both valves 82 and 83 and the connecting passages to chamber 35 of cylinder 11. The vacuum in the latter thus being gradually destroyed, cylinder 11 begins to move upwardly at a comparatively rapid rate. As fingers 88 and 89 begin to ride up on the inclined surfaces 96 on the cams and start to close valves 82 and 83, the resistance to the movement of cylinder 11 is increased by the reduction of inflow of air, thereby retarding the movement of the clutch pedal. As fingers 88 and 89 ride onto cam surfaces 94 and 90, both valves 82 and 83 will be completely closed. This latter preferably occurs at the point at which the clutch surfaces start to engage. Since the only air that can now enter cylinder 11 must enter through opening 77 and past needle valve 78, the movement of the clutch pedal at this point will be very slow. This retarded movement of the clutch near the point of engagement of the driving surfaces permits the slow and gradual acceleration of the vehicle without jerking of the same. As momentum is gained and the clutch continues to move slowly into driving engagement, finger 88 rides off of surface 94 onto surface 92, thereby permitting the opening of valve 82, while valve 83 remains closed. This allows more air to enter cylinder 11 past the needle valve 79, thus permitting a somewhat more rapid engagement of the clutch while the vehicle picks up speed. With the further upward movement of cylinder 11, finger 88 begins to ride up the incline 97 to cam surface 93, again closing valve 82. This occurs preferably at the point at which the clutch is nearly fully engaged, said valve being momentarily kept closed to permit the vehicle to gain further momentum while the clutch is held nearly stationary. The clutch is fully engaged when both fingers 88 and 89 ride down off the surfaces of the cam blocks, permitting free entrance of air to chamber 35 and hence a relatively rapid movement of the clutch pedal to the limit of its upward movement. This latter movement is allowed to insure the full engagement of the clutch and to permit disengagement of the operating extension or fork 8 from the clutch collar 9 to prevent undue wear.

Thus in the engaging movement of the clutch, the initial movement is very rapid to quickly take up the lost motion so as to not delay starting and prevent racing of the engine through the operation of the accelerator pedal. At the point at which the clutch first begins to engage, the movement of the clutch pedal and hence the clutch surfaces is substantially retarded to permit the clutch to take hold and start the vehicle with an easy, gradual movement without jumping or jerking. After the vehicle starts to move, the clutch is let in more rapidly for a short period to get a greater engagement and driving force, and then the pedal movement is held stationary for a short time while the vehicle gathers more speed, after which the clutch is let into full engagement and the remainder of the lost motion of the pedal is comparatively rapid. It will thus be apparent that the present device automatically controls the engaging movement of the clutch to provide clutch operation which is a duplicate of expert foot control so that no matter how inexperienced or inexpert the driver may be the clutch is always operated in the same ideal manner to start the vehicle without jumping or jerking. Excessive strains on the vehicle and tires and discomfort to occupants are accordingly eliminated. The device also prevents stalling of the motor, since the clutch is let in at the proper speed and eliminates racing of the motor such as might occur if the clutch is not engaged soon enough in foot operation.

In order to prevent any racing of the motor when the clutch is disengaged, means may be provided whereby the throttle is moved to idling, or other selected position, at the same time the clutch is disengaged in the manner above described. One form of device for attaining this result is illustrated in Figs. 4 and 5, wherein a solenoid 113, which may, if desired, be connected in series with solenoid 21, is provided with an armature 114 connected through a lever 115 to throttle valve 56. Thus when the circuit is closed through solenoid 113 by the closure of switch 60, 63, armature 114 is attracted to the left and closes valve 56. In order that the throttle valve may also be controlled, as described above, through accelerator pedal 54 and rod 55, and in order that said valve may be closed by the movement of armature 114 irrespective of the position of pedal 54, the latter is connected to valve 56 by means of a slip link. As shown, the slip link comprises a member 116 threadedly mounted on the lower end of rod 55 and provided with an elongated slot in which a pin 117 on a lever 118, connected to valve 56, is adapted to slide against the action of a spring 119. This spring is of sufficient strength to operate the throttle under normal foot operation of pedal 54 but is not sufficient to overcome the action of armature 114 to move to close said throttle when solenoid 113 is energized. A stop 120 may be provided for cooperating with the inner end of armature 114 to limit the closing movement of the throttle by solenoid 113. Armature 114 is preferably adjustably mounted on arm 115. It will thus be seen that when the circuit is closed to solenoids 21 and 113, throttle 56 will be closed simultaneously with the disengagement of the clutch, and this irrespective of the position of accelerator pedal 54.

Although only a limited number of embodiments of the invention have been illustrated and described, it is to be expressly understood that the same is not limited thereto but that various changes may be made in the mechanical details as well as the design and arrangement of parts illustrated without departing from the spirit and scope of the invention. Reference will, therefore, be had primarily to the appended claims for a definition of the limits of the invention.

What is claimed is:

1. In clutch control apparatus for automotive vehicles, the combination of fluid pressure actuated means for effecting disengagement of the clutch, a valve adapted to be operated by movement of the vehicle accelerator for controlling said fluid pressure actuated means, and means for controlling the engagement of the clutch, said last named means being adapted to control the fluid pressure in said first named means to permit relatively rapid movement of the clutch in engaging direction up to a point where the clutch is about to engage and then to cause relatively slow movement of the clutch during actual engagement.

2. In a motor vehicle, the combination, with the engine and its manifold, the accelerator, and the clutch mechanism, of a cylinder having a piston reciprocating therein, an operative connection between said piston and the clutch mechanism, a fluid transmitting connection between said cylinder at one side of the piston and said manifold, means controlled by said accelerator for opening and closing said fluid transmitting connection, and means operative during the clutch closing stroke of said piston for varying the fluid pressure in said cylinder to retard the movement of the piston, the movement of said piston during the first part of its stroke being relatively rapid.

3. In a vacuum operated clutch control mechanism for an automotive vehicle having an internal-combustion engine, a throttle, an accelerator pedal, a connection between said pedal and throttle, and a clutch, said clutch control mechanism including a fluid motor, a mechanical connection between said motor and clutch and fluid transmitting connections between the intake manifold of said engine, said motor and the atmosphere, said latter connections including an accelerator controlled three-way control valve for said motor and further including control valves for determining the mode of engagement of the clutch.

4. In a motor vehicle having an accelerator and a clutch, the combination therewith of a fluid pressure operated power device connected to the clutch and capable of releasing it, a source of sub-atmospheric pressure, means for connecting the power device with said source, and means controlled by said accelerator for opening and closing said connecting means, said power device comprising means for varying the resistance to the engaging movement of the clutch.

5. In a motor vehicle having an accelerator and a clutch, the combination therewith of a fluid pressure operated power device connected to the clutch and capable of releasing it, a source of suction, means for connecting the power device with said source, means controlled by said accelerator for opening and closing said connecting means, and control means for said power device for varying the resistance of the latter to the engaging movement of the clutch.

6. In a motor vehicle having an accelerator and a clutch, the combination of a power device connected to the clutch and capable of releasing it, a control device for the power device to cause it to function to release the clutch, said control device including means controlled by said accelerator, and control means for said power device for varying the resistance of the latter to the engaging movement of the clutch.

7. In a motor operated vehicle including an engine and a clutch for connecting the engine with the drive shaft of the automobile, suction controlled means operatively connected with the clutch and the intake manifold of the engine to operate the clutch, foot operated means to control the operation of the suction operated means, and means connecting the foot operated means with the throttle valve of the engine to operate said throttle valve simultaneously with or independently of the clutch.

8. In an automotive vehicle provided with a clutch and an internal-combustion engine having a throttle, power means for operating the clutch, said power means comprising a control valve, and means for operating the throttle and valve comprising a manually operable bodily and angularly movable member.

9. In an automotive vehicle provided with a clutch, a throttle and a throttle controlling accelerator pedal, power means for operating said clutch, said means including means for effecting two distinct stages of clutch engaging movement, and means interconnecting said pedal, power means and throttle, said interconnecting means being constructed and arranged to open the throttle and automatically engage the clutch with one direction of movement of said pedal and to open the throttle without engaging the clutch with a different direction of movement of said pedal.

10. In an automotive vehicle provided with a clutch, an engine throttle, power means for operating the clutch including a pressure differential operated motor, a three-way control valve and valve means built into said motor for effecting first a rapid clutch engaging operation of the motor, after said three-way valve is operated to engage the clutch, and then a relatively slow clutch engaging operation of the motor, together with common means controlling the throttle and three-way, said power means being operative, with operation of said common means, to substantially simulate a manual engagement of the clutch both in starting the vehicle and in controlling the same thereafter when the vehicle is in motion.

11. In an automotive vehicle provided with a clutch, an engine, a propeller shaft, an accelerator and a throttle, power means for operating the clutch, said means including a control valve to initiate clutch disengaging and engaging operations of said power means, said power means further including means to effect a relatively rapid clutch engaging movement up to a point at which the clutch plates are about to contract, and thereafter a relatively slow clutch engaging movement, and linkage interconnecting said accelerator, control valve and throttle, said linkage permitting of an opening of the throttle to synchronize the speeds of the internal combustion engine and propeller shaft prior to a clutch engaging operation of said control valve.

12. In a clutch control device for motor vehicles including throttle operating means and a spring tending to cause engagement of the clutch, means for automatically controlling engagement of the clutch comprising relatively movable members forming a fluid pressure chamber, means for connecting one of said members with the clutch, a connecting passage from the interior of the chamber to the atmosphere, means controlled by said throttle operating means for controlling said passage, and other means operated by movement of the clutch for controlling said passage to control the degree of vacuum in said cylinder and thus control resistance to movement of the clutch under the action of the spring.

13. In an automotive vehicle provided with a clutch and throttle operating means, a power device connected to the clutch and capable of releasing it, valve means controlled by said throttle operating means and operable to initiate the clutch disengaging and engaging operations of said power device, and control means for said power device for varying the resistance of the latter to the engaging movement of the clutch.

14. In a motor vehicle having a throttle and a clutch, the combination therewith of a pedal adapted for linear movement and angular movement about the line of said linear movement as an axis, a power device connected to the clutch and capable of releasing it, means controlled by the linear movement of said pedal for causing the power device to function to disengage the clutch, control means for said power device for varying the resistance of the latter to the engaging movement of the clutch, and means for connecting said pedal and throttle whereby the latter is actuated by said angular movement of said pedal.

15. In a control device for motor vehicles having throttle operating means, a movable member, resilient means associated with said member, a power device connected to said member for moving the latter in one direction in opposition to said resilient means and capable of releasing it for movement in the other direction by said resilient means, means for connecting the power device to a source of sub-atmospheric pressure, means controlled by said throttle operating means for controlling said connecting means, and control means for said power device for varying the resistance of the latter to the return movement of said member by said resilient means.

16. In a control device for motor vehicles having throttle operating means, a movable element, resilient means tending to move said element in one direction, means for controlling the movement of said element by said resilient means comprising a pair of relatively movable members forming a fluid pressure chamber, means for connecting one of said members with said element, a connecting passage from the interior of said chamber to the atmosphere, and means for controlling the flow of air through said passage including means controlled by said throttle operating means and a cam operatively associated with one of said relatively movable members.

17. In an automotive vehicle provided with a clutch and throttle operating means, a power device operatively connected to the clutch, a control device including said throttle operating means for effecting actuation of said power device to disengage the clutch and to release the clutch elements for return movement toward engaged position, and means operative when the clutch elements reach an intermediate position for increasing the resistance of the power device to the engaging movement of the clutch.

18. In a motor vehicle having a throttle and clutch, the combination therewith of an accelerator pedal adapted for both linear and angular movement, power means controlled by the linear movement of said pedal for disengaging said clutch and controlling the engagement thereof, and means connecting said pedal and throttle whereby the latter is adapted to be actuated by angular movement of said pedal.

19. In a motor vehicle having a throttle and clutch, the combination therewith of a fluid pressure operated power device connected to the clutch and capable of releasing it, a source of suction, means connecting the power device with said source, an accelerator pedal adapted to be moved bodily in a straight line and to be moved angularly about said line as an axis, valve means controlled by said straight line movement of said pedal for opening and closing said connecting means, and means connecting said pedal and throttle whereby said throttle is actuated by angular movement of said pedal.

CHARLES A. BREWER.